United States Patent
Ha et al.

(10) Patent No.: US 9,716,409 B2
(45) Date of Patent: Jul. 25, 2017

(54) MOTOR WITH STATOR CORE HAVING OVERLAPPING INSULATOR INSULATION FILM

(71) Applicant: LG ELECTRONICS INC., Seoul (KR)

(72) Inventors: Hyunho Ha, Changwon-si (KR); Sungjung Kim, Changwon-si (KR); Hyunwoo Jung, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 646 days.

(21) Appl. No.: 13/961,193

(22) Filed: Aug. 7, 2013

(65) Prior Publication Data
US 2014/0203671 A1    Jul. 24, 2014

(30) Foreign Application Priority Data
Jan. 18, 2013    (KR) .................. 10-2013-0006155

(51) Int. Cl.
*H02K 1/04* (2006.01)
*H02K 3/32* (2006.01)
*H02K 3/52* (2006.01)

(52) U.S. Cl.
CPC ............ *H02K 1/04* (2013.01); *H02K 3/32* (2013.01); *H02K 3/522* (2013.01)

(58) Field of Classification Search
USPC ........... 310/43, 214, 215, 71, 179–210, 156
See application file for complete search history.

(56) References Cited

U.S. PATENT DOCUMENTS

| | | | | |
|---|---|---|---|---|
| 4,624,762 A | * | 11/1986 | Abbey et al. | 428/418 |
| 6,492,749 B1 | * | 12/2002 | Shiga | H02K 3/345 |
| | | | | 310/216.067 |
| 7,271,512 B2 | * | 9/2007 | Lee et al. | 310/43 |
| 7,342,334 B2 | | 3/2008 | Hilton et al. | 310/71 |
| 8,110,959 B2 | * | 2/2012 | Hultman et al. | 310/216.113 |

(Continued)

FOREIGN PATENT DOCUMENTS

| | | |
|---|---|---|
| CN | 101192767 A | 6/2008 |
| JP | H 06-54495 | 2/1994 |

(Continued)

OTHER PUBLICATIONS

Chinese Office Action dated Jan. 4, 2016 issued in Application No. 201310342724.X (with English translation).

(Continued)

*Primary Examiner* — Naishadh Desai
(74) *Attorney, Agent, or Firm* — KED & Associates, LLP

(57) ABSTRACT

There are disclosed a motor comprising a stator and a rotor rotary with respect to the stator, the stator comprising a stator core comprising a back yoke and a plurality of teeth projected from the back yoke 311 in a radial direction; an insulator provided in a predetermined portion in a radial direction with respect to the stator core to insulate the stator core from outside; and an insulation film formed from the other portion in the radial direction with respect to the stator core to the plurality of the teeth, to insulate stator core from the coil and the teeth, so as to reduce the manufacture price, with an easy manufacture process and an improved product reliability.

12 Claims, 12 Drawing Sheets

(56) References Cited

U.S. PATENT DOCUMENTS

| | | | |
|---|---|---|---|
| 8,729,748 B2* | 5/2014 | Ueno | H02K 1/148 |
| | | | 310/216.005 |
| 2002/0113519 A1* | 8/2002 | Brown | 310/254 |
| 2005/0146232 A1* | 7/2005 | Yamamoto et al. | 310/43 |
| 2007/0126306 A1* | 6/2007 | Wu et al. | 310/179 |
| 2008/0129131 A1* | 6/2008 | Shin et al. | 310/71 |
| 2009/0121820 A1 | 5/2009 | Tatematsu et al. | |
| 2009/0189475 A1* | 7/2009 | Shin | 310/195 |
| 2011/0012445 A1* | 1/2011 | Nakanishi et al. | 310/43 |
| 2012/0001515 A1* | 1/2012 | Kudose et al. | 310/216.009 |
| 2013/0009513 A1 | 1/2013 | Jang et al. | |
| 2014/0062253 A1* | 3/2014 | Andonian | 310/216.065 |

FOREIGN PATENT DOCUMENTS

| | | |
|---|---|---|
| JP | 2001-037135 | 2/2001 |
| KR | 10-2002-0011858 A | 2/2002 |
| KR | 20-0408923 Y1 | 2/2006 |
| KR | 10-2008-0049989 A | 6/2008 |
| KR | 10-2009-0065936 A | 6/2009 |
| KR | 10-2011-0122365 A | 11/2011 |
| KR | 10-2011-0122648 A | 11/2011 |

OTHER PUBLICATIONS

European Search Report dated Jan. 25, 2016 issued in Application No. 13175063.0.
European Search Report dated Jan. 5, 2017 issued in Application No. 131750630.0.

* cited by examiner

MOTOR WITH STATOR CORE HAVING OVERLAPPING INSULATOR INSULATION FILM

Pursuant to 35 U.S.C. §119(a), this application claims the benefit of earlier filing date and right of priority to Korean Application No. 10-2013-0006155, filed on Jan. 18, 2013 the contents of which are hereby incorporated by reference herein in their entirety.

BACKGROUND OF THE DISCLOSURE

Field of the Disclosure

The present invention relates to a motor, more particularly, to a motor that is able to reduce the manufacture price, with an easy manufacture process and improved product reliability.

A motor according to embodiments may be a motor applied to a washing machine and examples of apparatuses the motor can be applied to are not limited to the washing machine.

Discussion of the Related Art

Generally, a motor is configured to transfer a rotational force of a rotor to a shaft for the shaft to drive a load. For example, the shaft is connected to a drum provided in a washing machine to drive the drum or it is connected to a fan provided in a refrigerator to drive the fan to supply cold air to a space requiring the cold air.

In such a motor, a rotor is rotated by an electromagnetic interrelation with a stator. For that, a coil is wound around the stator and currents are applied to the coil, to rotate the rotor with respect to the stator.

The stator includes a stator core and the stator core is formed of a conductor. The stator is typically fixed to an object. Fixing means are required to fix the stator to such an object as a motor housing or a motor bracket. In addition, the coil is wound around the stator and insulation means have to be provided between the coil and the stator core. A tap terminal structure has to be provided to apply the powder to the coil.

Because of such characteristics of the motor, the stator has to include the fixing means mentioned above, the stator core, the coil and the insulation structure for insulation from the tap terminal.

The coil is typically formed of copper. This is because copper has a good electrical conductivity and a good ductility, with less damage when it is wiring.

However, such a copper material has a high raw price enough to increase the production cost of the motor. Internationally, copper demand is rising suddenly such that stable supply and demand of copper cannot be performed frequently.

As a result, it is proposed that a coil formed of another material, not the coil formed of the copper should be used to lower the production cost of the motor and to make stable supply and demand of raw materials. In addition, even when the coil formed of another material is used, it is necessary to manufacture a motor having at least the same or better quality, compared with the conventional copper coil.

Meanwhile, in case the copper coil is replaced with the coil formed of another material, it is preferred that a conventional structure of a motor is not changed greatly. Even if the raw price of coil is reduced, the other components have to be designed and fabricated newly. In this instance, there are concerns of high design costs and initial equipment investment costs.

Referring to FIGS. 1 and 2, a conventional motor will be described in detail as follows. The motor shown in the drawings is one example of a motor for driving a drum provided in the washing machine. The motor is an outer rotor type motor having an outer rotor rotated on a stator. However, the present invention is not limited such the motor.

First of all, referring to FIG. 1, a stator composing the conventional motor for the washing machine will be described.

A stator 100 may include a stator core 110, an upper insulator 120 and a lower insulator 130.

The stator core 110 has a back yoke and teeth 112 projected in an outer radial direction along an outer circumference of the back yoke 111. FIG. 1 illustrates the stator provided in the outer rotor type motor including the rotor which will be described later. Alternatively, the teeth may be projected in an inner radial direction along the outer circumference of the back yoke 111. In this instance, the stator may be a stator provided in an inner rotor type motor.

Meanwhile, to form the stator core 110, steel sheets are blanked and layered. However, in case of using such a method, the circular steel pieces generated in the stator core cannot be used and material waste might be caused. Accordingly, it is preferred that a band-shaped back yoke and teeth projected from the back yoke perpendicularly are curved and layered in a spiral shape, to be a spiral core type. Such a spiral core is shown in FIG. 1.

A caulking 113 is formed in the layered annular back yoke 111 to make the layers coupled to each other so as to form stator core integrally.

A coil (not shown) is wound around the teeth 112. However, the teeth may generally be formed of a conductive material and an insulator is provided between the teeth and the coil to insulate the teeth from the coil. For example, insulators 120 and 130 are provided on and under the stator core 110, respectively. In other words, an upper insulator 120 and a lower insulator 130 are coupled to upper and lower portions of the stator core 110, respectively, to surround the stator core 110. At this time, the coil is wound around wiring portions 120A and 130A surrounding the teeth 112.

The wiring portions 120A and 130A may include teeth receiving portions 121 and 131. In other words, the teeth 112 may be insertedly received in the teeth receiving portions 121 and 131, such that the teeth receiving portions 121 and 131 may be positioned between the wound coil and the teeth 121 for insulation between the coil and the teeth.

Meanwhile, the insulators 120 and 130 include fixing portions 120B and 130B provided outside or inside with respect to a radial direction of the wiring portions 120A and 130B.

The wiring portions 120A and 130A and the fixing portions 120B and 130B may be integrally formed as one body. In other words, the upper insulator 120 may be configured of the wiring portion 120A and the fixing portion 120B integrally formed with each other. The insulator 120 and 130 may be formed of a plastic material and the plastic material is injected in a mold as one body.

Here, the wiring portion 120A and 130A may be the portions connected to the teeth 112. The fixing portions 120B and 130B may be the portions connected to the back yoke 111. Accordingly, the wiring portion is configured to perform an insulation function between the back yoke and the teeth and the fixing portion is configured to perform an insulation function between the back yoke and the other components. The other components may include a coil, coil ends, an object where the stator is fixed and the like.

The fixing portion 120B and 130B may include a coupling boss 125 and 135 projected in an inner radial direction. A coupling hole 126 and 136 may be formed in the coupling boss to fixedly position the stator to a rear wall surface (not shown) of a tub provided in the washing machine. Such a coupling boss is not necessarily configured to fix the stator to the tub. According to embodiments, the coupling bosses 125 and 135 may be configured to couple the stator to a bracket (not shown) or a motor housing (not shown) defining an exterior appearance of the motor.

In case the washing machine is a horizontal shaft type, the stator 100 is fixed to a rear wall surface of the tub and to drive the drum directly. In case the washing machine is a vertical shaft type, the stator is oriented to a lower wall of the tub to drive the drum directly. An upper part of the vertical shaft type washing machine can be a front surface and a lower part thereof can be a rear surface. Accordingly, in any types, the stator 100 can be fixed to the rear wall surface of the tub.

The coupling hole 126 of the upper insulator and the coupling hole 136 of the lower insulator are corresponding to each other to form one coupling hole 126 and 136, when the upper insulator, the stator core and the lower insulator are coupled. The entire stator may be fixed to the tub mentioned above by fastening a bolt (not shown) to the coupling hole.

Moreover, a position determination projection 127 may be formed adjacent to the coupling hole 126 of the upper insulator. Specifically, the position determination projection is inserted in a groove (not shown) formed in the tub and the position of the stator 100 is determined. After that, the stator 100 can be secured by using the bolt mentioned above.

Meanwhile, the coil corresponding to u, v and w power phase may be wound around the stator shown in FIG. 1. One coil may be wound around one tooth to make one tooth have one magnetic pole, which is called as "concentrated winding". As there are more and more magnetic poles, the maximum rotational number of the rotor is getting lower. Accordingly, it can be easier to control the motor and the highest torque can be relatively increased.

First of all, the winding of the coil around one tooth on the u angle is completed, the coil is fixedly wound around a coil winding rib 122 formed in the upper insulator and then wound around the next tooth, after passing two neighboring teeth. A starting end and the finishing end of the u-coil is positioned at a tap terminal 128 for power connection and a neutral point tap terminal 129, respectively. Coils are wound on v and w power phase according to such a method.

Here, a connector 140 is connected to the tap terminal for the power connection and a 3-phased power is applied to the coils on u, v and w power phase. Also, ends of each coil are electrically connected with each other at the neutral point tap terminal 129 to form the neutral point.

Outer surfaces of the tap terminals 128 and 129 are formed of an insulative material, integrally formed with the insulator. In other words, the fixing portion 120B of the insulator may include the tap terminals 128 and 129. Accordingly, when coil ends are fixedly positioned at the tap terminal, the insulation may be performed between the stator core and the coil ends.

Meanwhile, a hall sensor assembly 141 is fixed in the tap terminal, in other words, the tap terminal 128 for power connection and the neutral point tap terminal. The position and/or speed of the rotor may be sensed via the hall sensor assembly, to adjust the phase of the applied voltages and the intensity of the currents so as to control the rotational number and torque of the rotor.

An insulator rib 123 may be formed in an inner radial portion of the coil winding rib 122 in a circumferential direction. Such the insulator rib 123 is formed not only in the upper insulator but also the lower insulator. The insulator rib 123 has a predetermined height or more to perform a function of blocking the moisture of the insulator from flowing to the wiring portions 121 and 131.

In addition, it is preferred that the height of the insulator rib 123 is larger than the height of the wound coil. This is because there is concern of damage to the coil caused by other objects placed nearby when the stator 100 is treated. In other words, when placing the stator on the floor, only the insulator rib 123 is in contact with the floor and the coil is not in contact such that the coil damage can be prevented effectively.

Also, the insulator rib 123 may be configured to distinguish the portion where the coil ends are fixed or the coil is wound or moved in the insulator from the portion where the stator is fixed to the object. Accordingly, electric leakage of currents flowing to the object via the coil can be prevented.

Referring to FIG. 2, the rotor provided in the motor for the conventional washing machine will be described.

The rotor 200 provided in the conventional motor includes a rotor frame 210 and a permanent magnet 216.

The rotor frame 210 includes a base 212 and a lateral wall part 211 coupled to lateral portions of the base. The base 212 and the lateral wall part can be formed by pressing one steel plate. Here, a plurality of permanent magnets can be provided in inner portions of the lateral wall part along a circumferential direction. The permanent magnets are alternated in an order of N and S poles.

The lateral wall part 211 is functioned as a back yoke for forming a magnetic circuit.

Alternatively, the rotor frame can be formed according to an injection molding process and an annular magnetic back yoke can be additionally provided in this instance.

A raised hub 213 is formed in a central portion of the base 212 to reinforce the rigidity of the base. The hub 213 has a penetrating hole 219 formed in a central portion and a shaft (not shown), for example, the shaft of the washing machine is positioned in the penetrating hole. The shaft and the hub 213 can be connected with each other via a connector not shown in the drawings such that the rotational force of the rotor can be transmitted to the shaft as the rotor is rotated.

The coupling hole 214 configured to couple the connector therein or the position determination groove 215 configured to determine the coupling position of the connector may be formed in the hub 213.

Such the rotor 200 receives the stator 100 therein and it is rotated with respect to the stator 100 according to the interrelation with the stator. The rotational force of the rotor is transferred to the shaft (not shown) integrally rotated with the rotor frame 210.

In the conventional motor mentioned above, the insulator 120 and 130 includes the fixing portion 120B and 130B and the winding portion 120A and 130A. In other words, the winding portion extended from an inner or outer radial portion along a radial direction of the fixing portion. Accordingly, the insulator is configured to be coupled to the back yoke 111 and the teeth 112 as an independent element.

The number of the winding portions is increasing according to the number of the teeth formed in the stator 100. Like the teeth, the winding portions may be spaced apart from each other along a circumferential direction. The appearance of the insulator having the fixing portions and the winding portions integrally formed with each other might be so complicated that it is not easy to fabricate such the insulator.

Moreover, when fabricating or treating the insulator, the winding portions are likely to have damage. It is limited to enhance the rigidity of the portion where the winding portions 120A and 130A are connected to the fixing portions 120B and 130B and it is closely related to the thickness and material of the winding portions.

As the thicknesses of the winding portions are increased, the gap between the winding portions is getting narrower. This is because the thickness of the winding portions covering both lateral surfaces of the teeth is increasing. The frequency of winding the coil around the winding portions cannot help decreasing noticeably, because the minimum insulation distance has to be secured between each two neighboring coils.

As the thicknesses of the winding portions are increasing, the height of the coil cannot help increasing noticeably. This is because the thickness of the winding portion covering the top or lower surfaces of the teeth is increasing. Accordingly, the height of the wound coil cannot help increasing remarkably. There might be a problem of unnecessarily increased stator volume and another problem of unnecessarily long length of the coil.

Those problems will be explained easily as follows. The frequency of winding the coil and the cross section area of the teeth 112 are important. As mentioned above, the coil is wound around the teeth 112. When the cross section area of the teeth 112 is determined, the winding frequency and height of the coil and the overall length of the coil can be uniform. However, as the plastic structure surrounds the teeth 112 as mentioned above, the coil is wound around the plastic structure and the cross section area where the coil is substantially wound is remarkably increase. Such increase of the cross sectional area can increase the height and the overall length of the coil noticeably. Moreover, it is limited to increase the coil winding frequency.

More specifically, a horizontal portion of the coil wound around the winding portion is irrelevant to the performance of the motor, except a vertical portion of the coil. The increase of the horizontal length of the coil results in increasing the material cost and weight of the motor as well as the resistance of the coil, such that ohmic loss could increase. This can be directly connected with deterioration of motor efficiency.

Accordingly, demands for a motor having an easy fabrication process and a reduced failure rate are increasing. There is a growing need to provide a motor having an enhanced efficiency and a reduced material cost.

The above references are incorporated by reference herein where appropriate for appropriate teachings of additional or alternative details, features and/or technical background.

SUMMARY OF THE DISCLOSURE

To overcome the disadvantages of the conventional motor, embodiments are directed to a motor.

An object of embodiments herewith is to provide a motor that is able to reduce coil usage to reduce the material cost and to reduce resistance of the coil to enhance motor performance and to reduce the overall motor.

Another object of embodiments herewith is to provide a motor that is able to realize a similar or identical performance of the conventional motor, with using an aluminum coil instead of a conventional copper coil.

A further object of embodiments herewith is to provide a motor that is able to reduce the manufacturing cost, with an easy manufacturing process, and to reduce damage on an insulator when treating or assembling the motor, only to improve the productivity.

To achieve these objects and other advantages and in accordance with the purpose of the invention, as embodied and broadly described herein, a motor including a stator and a rotor rotary with respect to the stator may provide an insulator and an insulation film independently provided in the stator core. The insulation film may be integrally formed with the teeth where coils are wound and the coil may be wound around the teeth having the insulation film formed thereon.

According to one embodiment, a motor comprising a stator and a rotor rotary with respect to the stator, the stator includes a stator core comprising a back yoke and a plurality of teeth projected from the back yoke 311 in a radial direction; an insulator provided in a predetermined portion in a radial direction with respect to the stator core to insulate the stator core from outside; and an insulation film formed from the other portion in the radial direction with respect to the stator core to the plurality of the teeth, to insulate stator core from the coil and the teeth.

Specifically, the insulator may be provided in an inner portion in a radial direction of the stator core and the insulation film may be in an outer portion in a radial direction of the stator core. The insulation film may be extended to the plurality of the teeth. That is, the insulation film may be extended from the teeth where the coils are wound.

The insulator may include an upper insulator and a lower insulator provided in a top and a bottom of the stator core to be coupled to the stator core. Here, the insulator may be fitted to the stator core. An upper insulator and a lower insulator may be fitted to each other via the stator core. For that, the insulator may be formed of a plastic material in an injection molding process.

The insulator may include a tap terminal having one end of the coil fixed thereto. The tap terminal may include a power connection tap terminal having ends of coils corresponding to u, v and w power phase fixed thereto and a neutral point tap terminal having the other ends of the coils corresponding to u, v and w power phase fixed thereto.

The insulator may include a coil winding rib configured to fix a draw lead formed when each of the coils at the u, v and w angle is moved from one tooth to another tooth.

The insulator comprises a coupling boss configured to couple the stator to an object. The insulator may be integrally formed with the tap terminal, the coil winding rib and the coupling boss. As mentioned above, the insulator may be formed in the plastic injection molding.

The tooth may include a tooth body extended in a radial direction of an outer or inner circumferential surface of the stator core to have the coils wound there around; and A pole shoe extended from one end of the tooth body in both circumferential directions to form a gap with the rotor.

The pole shoe may include a largest external diameter surface or a smallest external diameter surface configured to form the gap with the rotor; and an end surface formed from both sides of the largest external diameter surface or the smallest internal diameter surface in a direction where the gap with the rotor is getting larger.

The insulation film may be formed in an outer or inner circumferential surface of the core and an entire area of the tooth, except the largest external diameter surface or the smallest internal diameter surface of the pole shoe. For example, in case of an outer rotor type motor, the insulation film may be formed in an entire portion of the teeth and an outer circumferential surface of the stator core, except the largest external diameter surface of the pole shoe.

The insulation film may be formed by attaching polymer resin powder paint (Epoxy powder) to the stator core. Specifically, an electrostatic spray or an electrostatic fluidized bed method may be used in forming the uniform insulation film. Accordingly, the insulation film may be integrally formed with the stator core as one body.

The insulator may be coupled to the stator core having the insulation film integrally formed therewith. The insulation film and the insulator may insulate the outer surface of the stator core from the outside entirely.

Specifically, an inner portion in a radial direction of the stator core may be insulated by the insulator and an outer portion in the radial direction of the stator core may be insulated by the insulation film. At least predetermined portion of top and bottom surfaces of the stator core may be overappedly insulated by the insulator and the insulation film. In other words, the insulator may cover the portion of the top and bottom surfaces of the stator core where the insulation film is formed.

The insulation film may be provided not only for the insulation between the coil and the teeth but also for the insulation between the coil and the back yoke. For that, in case of the outer rotor type motor, the insulation film may be formed even in an outer circumferential surface of the stator core. In this instance, the insulation of the insulator can be performed to an inner circumferential surface of the stator core.

In another aspect of the embodiment, a motor comprising a stator and a rotor rotary with respect to the stator, the stator includes a stator core comprising a back yoke and a plurality of teeth projected to an inner portion or an outer portion in a radial direction of the stator core, to have a coil wound there around; an insulator formed by a plastic injection molding process to be coupled to the stator core; and an insulation film formed from an inner or outer circumferential surface of the stator core to an end of the teeth continuously to insulate the teeth from the coil, the insulator formed by heating and hardening a coated epoxy powder.

The insulation film may be formed the other portion of the teeth, except a largest external diameter surface or a smallest internal diameter surface of the teeth that forms a gap with the rotor.

In case of the outer rotor type motor, the insulation film may not be formed in a largest external diameter surface of the teeth. A magnetic circuit of the rotor may be formed via the largest external diameter surface. To form the magnetic circuit more smoothly, the insulation film may not be formed in the largest external diameter surface.

The insulation film may be formed to a predetermined portion of a top surface and a bottom surface of the stator core coupled to the insulator, and the insulator may be coupled to a top surface and a lower surface of the stator core. In the outer rotor type motor, the insulation film may be formed in an outer portion in a radial direction with respect to a central radius of the back yoke and not in an inner portion in the radial direction. The insulator may be configured to partially cover top and bottom surfaces of the back yoke where the insulation film is formed. Accordingly, the outer surface of the stator core may not be exposed outside via at least one of the insulator and the insulation film. Of course, the insulation film may not be formed in the largest external diameter surface or the smallest internal diameter surface to form the magnetic circuit.

A plurality of penetrating holes may be formed in the stator core along a circumferential direction and a projection is formed in the penetrating hole to be inserted in the penetrating hole to determine a coupling position of the insulator with respect to the stator core.

The insulation film may be formed only in predetermined portions of top and bottom surfaces of the stator core that is adjacent to the teeth with respect to the penetrating hole.

The insulator may be configured to cover top and bottom surfaces of the stator core.

The insulation film may be formed by coating, heating and hardening polymer resin powder.

7. A motor comprising a stator and a rotor rotary with respect to the stator, the stator comprising:
a stator core comprising a back yoke and a plurality of teeth;
an insulation film continuously formed in an outer circumferential surface of the stator core and even an end of the teeth to insulate the teeth and the back yoke from the coil; and
an insulator formed by a plastic injection molding process to insulate the stator core from a draw lead and an end of the coil, with a coupling boss formed therein to couple the stator to a rear wall of a tub provided in a washing machine, the insulator configured surround a top surface, a bottom surface and an inner circumferential surface of the stator core where the insulation film is formed.

The insulator comprises at least one of a tap terminal having an end of the coil fixedly positioned therein; a coil winding rib configured to fix a draw lead formed when each coil is moved from one tooth to another; and a coupling boss configured to fix the stator to an object.

At least one of the tap terminal, the coil winding rib and the coupling boss may be integrally formed with the insulator to form one body. For that, the insulator may be formed by a plastic injection molding process.

In a further embodiment, a motor including a stator where a coil wound there around and a rotor rotary with respect to the stator, the stator comprises a stator core having a back yoke and teeth; an insulator formed in a plastic injection molding process to insulate the stator core from a draw lead and an end of the coil, with a coupling boss formed to fix the stator to a rear wall of a tub, to cover top, bottom and inner circumferential surfaces of the stator core; and an insulation film continuously formed from an outer circumferential surface of the stator core to the end of the teeth, to insulate the teeth and the back yoke from the coil.

The coil may be formed of a conventional copper material and the coil may include a core line formed of an aluminum material.

An insulation film may be formed in the teeth where the coil is wound, not a plastic structure. Accordingly, a cross section area of the teeth where the coil is substantially wound can be reduced noticeably. This means the coil having a relatively large radius can be wound in the same winding frequency. For example, a coil formed of an aluminum material having a relatively large cross sectional area may be used. In other words, without re-designing the other elements, the same or more than similar performance can be realized, with changing the material of the coil and the cross section area of the coil.

The insulation film may be continuously formed from the top and bottom surfaces of the stator core to the outer portion in the radial direction.

The insulation film may be formed by attaching polymer resin powder paint.

In a still further embodiment, a motor comprising a stator 300 and a rotor 200 rotary with respect to the stator 300, the stator 300 includes a stator core 310 comprising a back yoke 311 and a plurality of teeth 312 projected from the back yoke 311 in a radial direction; and an insulator, wherein the insulator 320 and 330 comprises an insulation film 340 provided in a predetermined portion in a direction of the stator core 310 to insulate the stator core 310 and formed from the other portion in the radial direction of the stator core 310 to the plurality of the teeth 312 to insulate the plurality of the teeth 312 and the stator core 310 from the coil.

The insulation film may be integrally formed with the stator core and the insulator may be independently formed from the insulation film and the stator core, to be coupled to the stator core.

The insulation film may be formed by coating, heating and hardening the polymer resin powder and the hardened insulation film may be coupled to the stator core. Once the insulation film is formed, the insulator may be coupled to the stator core.

The insulator is formed in a plastic injection molding process and it is fitted to the stator core.

The insulation film may be partially formed to top and bottom surfaces of the stator core coupled to the insulator. The insulator may be coupled to a top and a bottom of the stator core having the insulation film formed thereon. The insulator may be configured to cover the top and bottom surfaces of the stator core. Accordingly, an overlapped insulation structure may be formed in the connected portion between the insulator and the insulation film and a more reliable insulation function can be realized.

According to the embodiments, coil usage can be reduced and the motor capable of reducing the material cost, enhancing the performance by reducing the resistance of the coil and reducing the overall weight can be provided.

Furthermore, the aluminum coil may be used in the motor having the conventional copper coil applied thereto, with realizing the similar or almost the same performance.

Still further, it is easy to fabricate the motor according to the embodiments so as to reduce the fabrication cost. Also, damage on the insulator generated when the motor is handled or assembled can be reduced as much as possible such that the motor productivity can be improved.

Still further, the height of the stator and the height of the rotor can be reduced and the more compact motor can be provided.

BRIEF DESCRIPTION OF THE DRAWINGS

The embodiments will be described in detail with reference to the following drawings in which like reference numerals refer to like elements wherein.

DESCRIPTION OF SPECIFIC EMBODIMENTS

In reference to the accompanying drawings, embodiments will be described in detail as follows.

Figure 1:
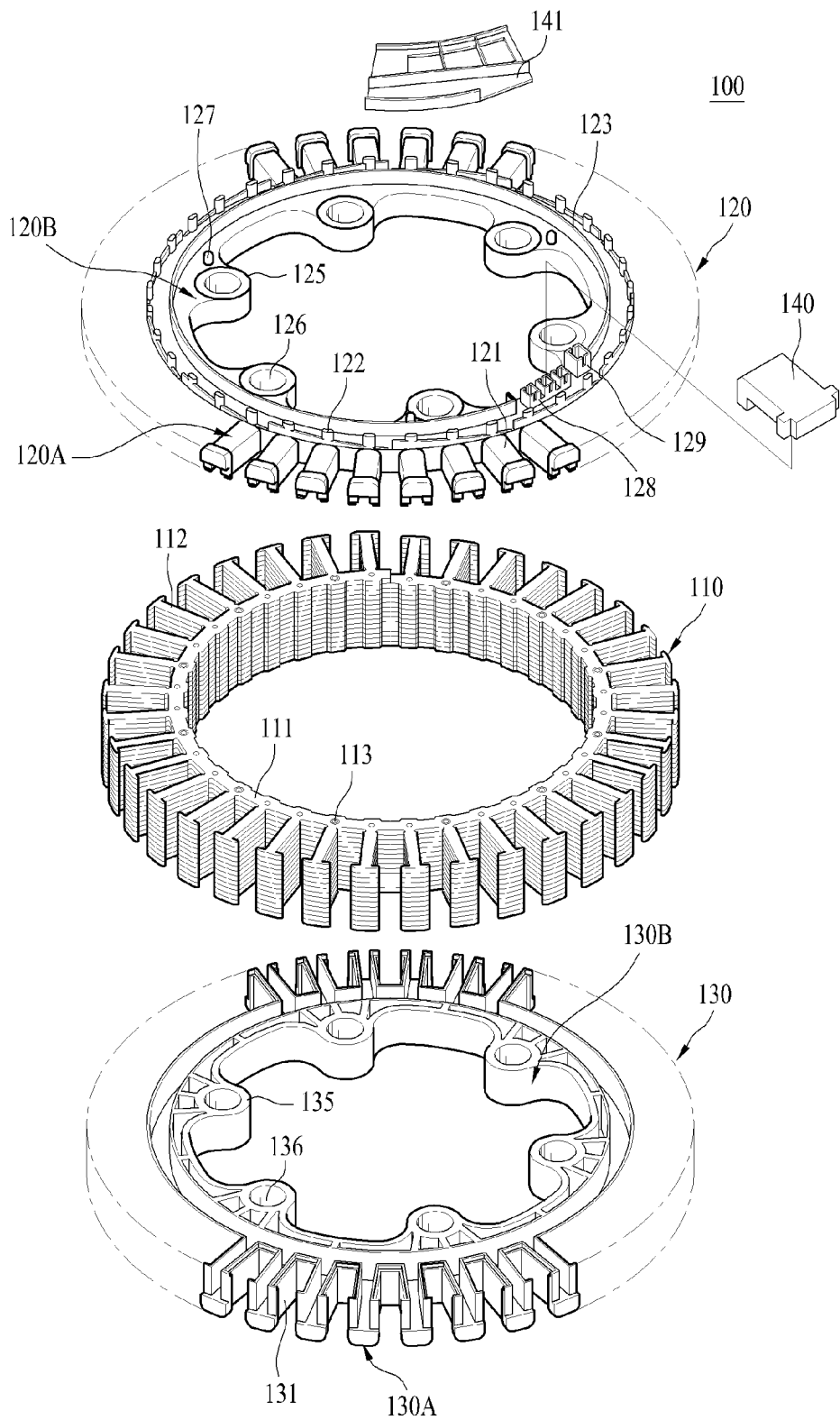
FIG. 1 is a cut-away perspective diagram of a stator provided in a conventional motor.
Figure 2:
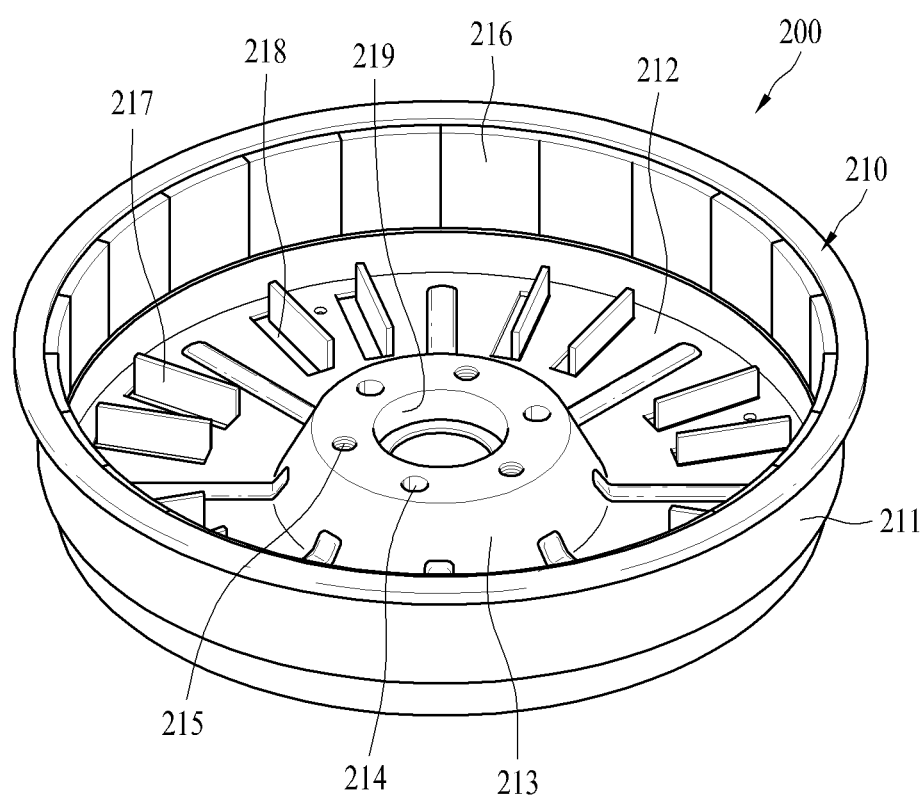
FIG. 2 is a perspective diagram of a rotor provided in the conventional motor.

First of all, referring to FIGS. 1 and 2, the conventional stator core 110 and the rotor 200 can be applied to the motor according to embodiments identically or similarly. Together with that, some characteristics of the insulator 120 and 130 described, referring to FIG. 1, may be applied to the embodiments similarly. Accordingly, reference will now be made in detail to the specific embodiments of the present invention, examples of which are illustrated in the accompanying drawings. Wherever possible, the same reference numbers will be used throughout the drawings to refer to the same or like parts.

Figure 3:
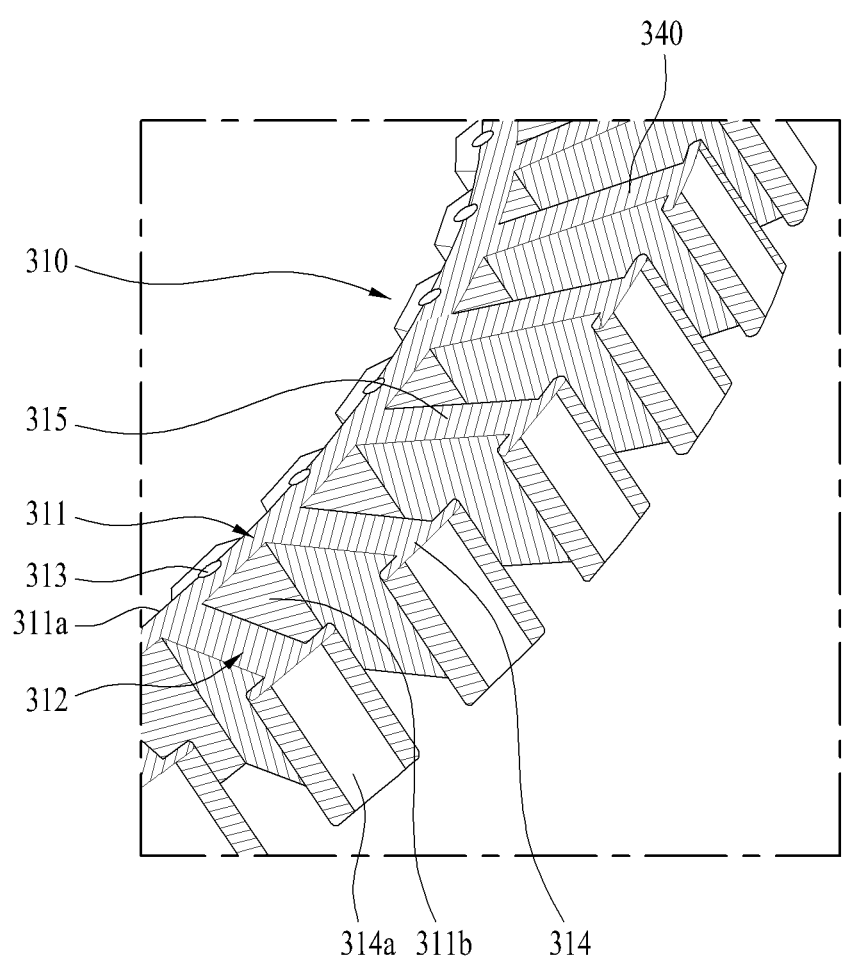
FIG. 3 is a partially cut-away perspective diagram of a stator core according to one embodiment.
Figure 4:
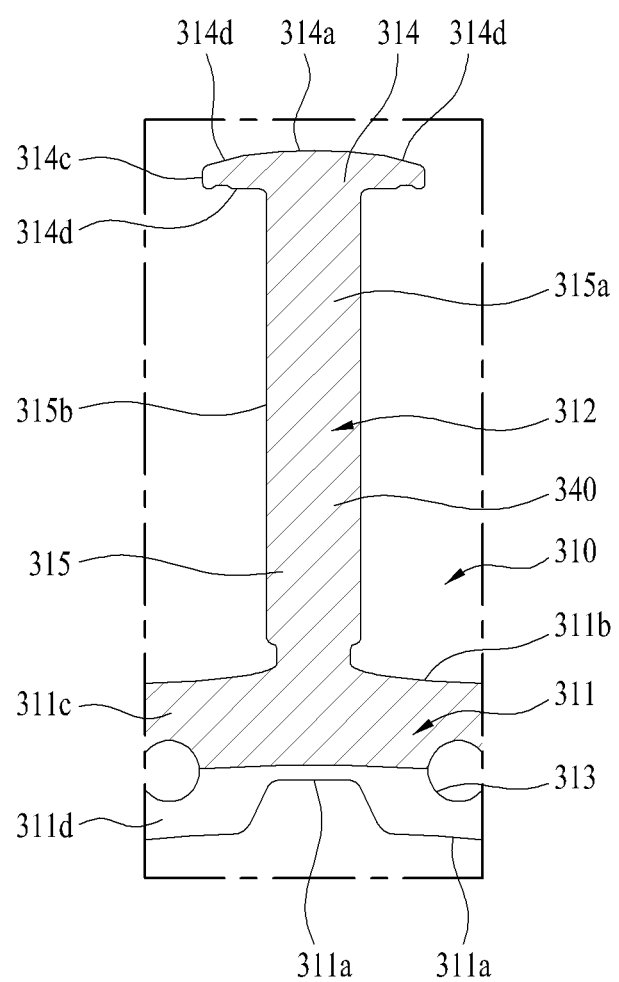
FIG. 4 is a plane diagram partially illustrating the stator core shown in FIG. 3.

Referring to FIGS. 3 and 4, a stator provided in the motor according to one embodiment, specifically, a stator core will be described in detail as follows.

Different from the conventional stator core, the stator provided in the motor according to this embodiment may include an insulation film integrally formed with the stator core 310. The insulation film 340 may be configured to insulate the stator core 310 from the outside.

In the drawings, the portion where the insulation film 340 is formed is shown as deviant crease lines for convenience sake and the portion with no deviant crease lines is not insulation-filmed.

The stator core 310 may include a back yoke 311 and a plurality of teeth 312. The stator core 310 is formed of a conductive material. The back yoke 311 forms a center of the core 310, in an annular shape. The teeth 312 may be formed along a circumferential surface of the back yoke 311. In other words, the teeth 312 may be projected in a radial direction of the back yoke 311.

According to a projected direction of the teeth 312, the motor can be an inner rotor type or outer rotor type. The motor shown in the drawings includes the teeth 312 projected in an outer radial direction with respect to the back yoke 311 and it can be an outer rotor type motor. The motor according to this embodiment may be the outer rotor type or the inner rotor type. The outer rotor type motor is exemplified in the drawings, for convenience sake to describe this embodiment.

A coil is wound around the teeth 312. One coil having one magnetic pole may be wound around one tooth. However, the teeth 312 consist of the stator core as a conductor and it is necessary to insulate the teeth 312 from the coil. In the conventional motor, the insulator is formed by injecting a plastic material in a mold to perform the insulation between the coil and the teeth. Because of that, the disadvantages mentioned above cannot help occurring.

According to this embodiment, the insulation film may be formed in the teeth 312 having the coils wound around. Specifically, the insulator provided in the teeth may not be provided and the insulation film can be formed. It is preferable that the thickness of the insulation film is much smaller than the thickness of the teeth 312 or the winding portion 120A and 130A formed in the insulator. The insulation film may be formed in the area the coils are wound, with a continuous and uniform thickness.

One tooth 312 may include a tooth body 315 and a pole shoe 314. The tooth body 315 is a portion where the coil is wound and the pole shoe 314 is an end that forms a gap with the rotor.

The pole shoe 314 may be extended from the end of the tooth body 315 in both circumferential directions, such that magnetic flux can be formed between the stator core 310 and the rotor smoothly.

More specifically, the insulation film 340 may be formed on an entire area of the tooth body 315. In other words, it is preferred that the insulation film 340 is formed on the tooth body 315 where the coil is directly wound. Accordingly, the insulation film 340 may be formed in a top surface, a lower surface 315a and both lateral surfaces 315b of the tooth body 315.

Meanwhile, it can be said that the tooth body 315 is provided between the back yoke 311 and the pole shoe 314. This is because the back yoke 311 and the pole shoe 314 can perform a function of restricting a ration movement of the coil. Accordingly, it is necessary to insulate the coil from the back yoke 311 and the pole shoe 314.

It is preferred that the insulation film 340 is formed even on an outer circumferential surface 311b of the back yoke 311 (in case of the outer rotor type motor). In addition, it is preferred that the insulation film 340 is formed even on the pole shoe 314, such that the insulation film 340 is configured to insulate the coil even from the back yoke 311 as well as from the teeth 312.

Meanwhile, an external diameter surface 314a of the pole shoe that has the largest external diameter directly faces the rotor via the gap. In other words, the external diameter surface 314a having the largest external diameter can be called as the portion having a high magnetic flux density and it can be called as "the largest outer diameter surface. Accordingly, it is not preferred that the insulation film 340 is not formed on the largest external diameter surface. In other words, the largest external diameter surface 314a may expose the stator core that is the conductor. In case of the inner rotor type motor, the surface may be the smallest internal diameter surface.

The pole shoe 314 may also perform a function of preventing the coil from separating outward in a radial direction and it may include an internal diameter surface 314b and right and left lateral surfaces 314c extended from an end of the tooth body 315 in both opposite directions. Here, for the insulation between the coil and the pole shoe 314, it is preferred that the insulation film 340 is formed on the internal diameter surface 314b and the right and left lateral surfaces 314c.

Both ends of the pole shoe 314 may include an end surface 314d formed from the external diameter surface 314a in a direction where the gap with the rotor is distant. Such an end surface may be provided in each of both sides possessed by the external diameter surface 314a, to relieve drastic variation of magnetic poles. A cogging torque is reduced by relieving the variation of the drastic magnetic pole and it is preferred that the insulation film 340 is formed even on the end surface 314b, such that the cogging torque can be reduced and the insulation distance can be increased between the coil and the external diameter surface 314a only to secure the stability.

Accordingly, the insulation film 340 may be formed from an outer circumferential surface of the back yoke 311 to the end of the pole shoe, specifically, the end surface 314d continuously.

In this embodiment, a coil is used that includes a core line formed of an aluminum material, not the coil formed of a copper material. Aluminum has a relatively large resistance, compared with copper. It is necessary to increase an external diameter of the coil to reduce such inner resistance, compared with the external diameter of the copper coil.

First of all, the thickness of the teeth having the insulation means, the thickness of the portion where the coil is wound and the area of the slot may be fixed. In other words, conditions for winding the coil may be fixed. At this time, the increase of the external diameter of the coil means that the winding frequency of the coil is decreased in the fixed conditions. Accordingly, it could be difficult to secure a desired performance of the motor. In other words, the material of the coil can be changed for the cost reduction and this could result in deteriorating the motor performance.

According to this embodiment, the coil winding portions 120A and 130B formed of a plastic material can be omitted and the insulation film 340 may replace the coil winding portions, such that the thickness of the wound coils increased by the insulation means can be reduced remarkably. That is, the thickness of the wound coils can be reduced, without re-designing the stator core. In addition, an area of the slot as the gap between the teeth can be increased.

The reduction of the thickness of the wound coil and the increase of the slot area can bring following effects.

First of all, in case of using the conventional stator core as it is, the winding frequency of the coil might be increased. In case there is no change in the coil winding frequency, the length of the coil can be reduced. The performance and efficiency of the motor can be improved accordingly.

Moreover, in case the external diameter of the coil is increased by changing the material of the coil, it is possible to secure the desired performance and efficiency of the motor. This is because it is possible to minimize the coil winding frequency or even to increase the coil winding frequency. Even when the aluminum coil replaces the copper coil, the same or more than similar performance can be secured. Of course, the raw material can be reduced noticeably by changing the material of the coil.

The length of the coil increased to the top and bottom of the tooth body 315 to wind the coil around the top and bottom surfaces 315a of the tooth body 315 can be reduced. The height of the coil provided in the top and bottom surfaces 315a of the tooth body 315 can be reduced remarkably, such that the overall length of the coil can be prevented from increasing unnecessarily and that the height of the stator can be prevented from increasing unnecessarily. This means that the height of the insulator rib 123 can be reduced.

As a result, the reduction of the raw material can be performed and the motor can be easily handled and maintained.

As mentioned above, an insulator may be provided for insulating the back yoke from a draw lead of the coil, insulating the back yoke from the end of the coil and insulating the back yoke from the outside. The insulator may include an upper insulator and a lower insulator. Here, the insulator may be provided for insulation of an inner portion of the radial portion with respect to the back yoke and the insulation film may be provided for insulation of an outer portion of the radial direction with respect to the back yoke.

Figure 5:
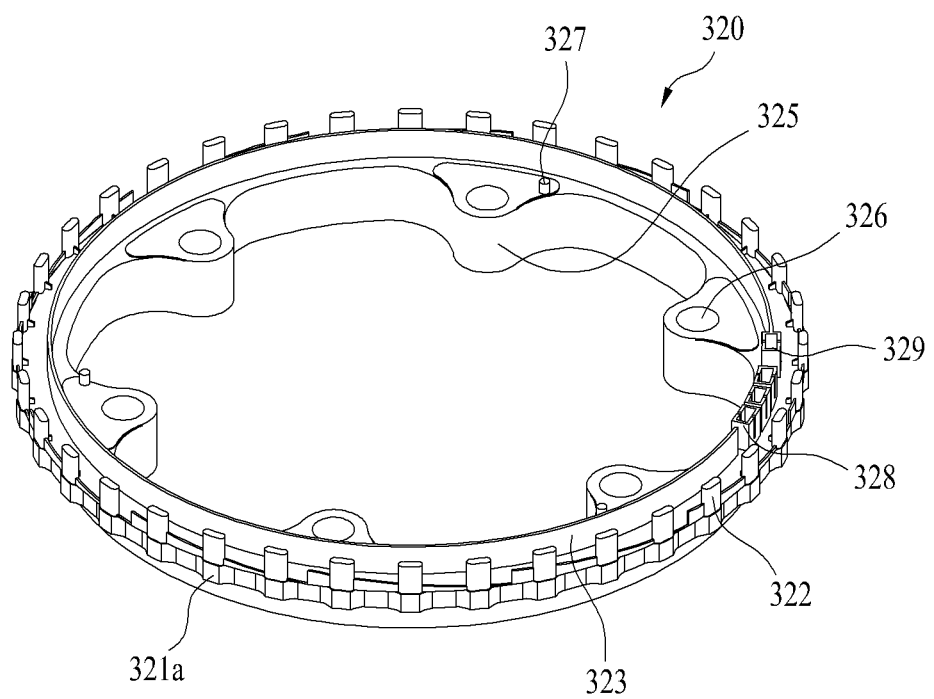
FIG. 5 is a perspective diagram illustrating a top surface of an upper insulator according to one embodiment.
Figure 6:
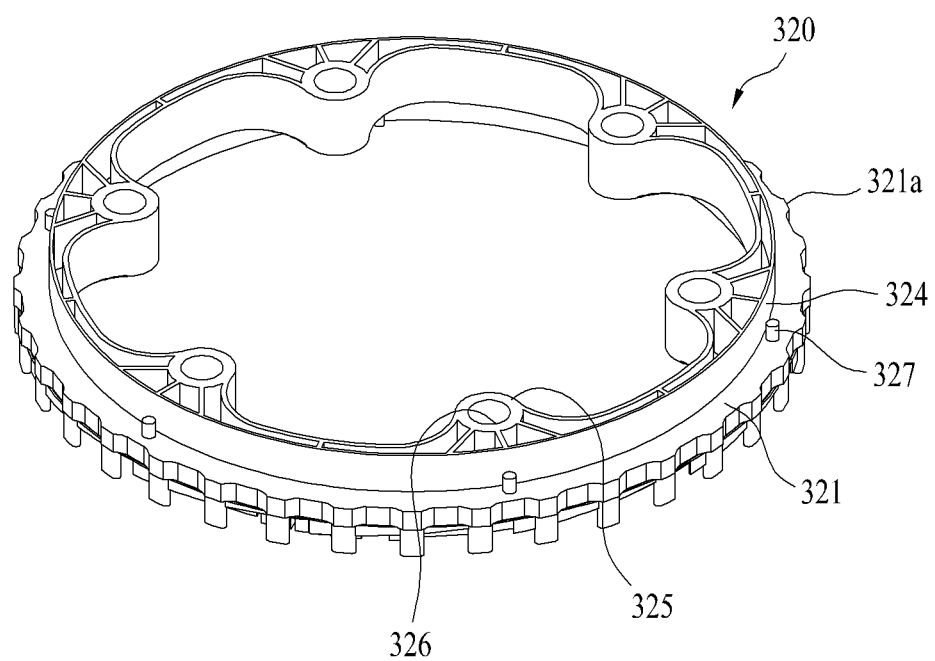
FIG. 6 is a perspective diagram illustrating a bottom surface of the upper insulator shown in FIG. 5.

Referring to FIGS. 5 and 6, the upper insulator 320 will be described in detail as follows.

FIG. 5 is a perspective diagram illustrating a top surface of an upper insulator 320 according to one embodiment. FIG. 6 is a perspective diagram illustrating a bottom surface of the upper insulator 320 shown in FIG. 5.

As shown in the drawings, the upper insulator 320 includes not winding portion 120B, different from the upper insulator 120 shown in FIG. 1, such that the fixing portion 120B and the specific configurations of the fixing portion may be similar or identical to those of the upper insulator 120.

Specifically, a coil winding rib 322, an insulator rib 323, a coupling boss 325, a coupling hole 326, a position determination projection 327 and tap terminals 328 and 329 may be similar or identical to corresponding components of the conventional motor.

However, in this embodiment, the upper insulator rib 323 may be lower than the conventional upper insulator rib, because the height of the coil is reduced. The coil winding rib 322 and the tap terminals 328 and 329 may be lower than the corresponding ones provided in the conventional motor. Accordingly, the height of the stator 320 can be reduced and a more compact stator can be provided. Such the height reduction of the stator 320 can make it possible to reduce the height of the rotor, such that the more compact motor can be provided.

A rotor according to this embodiment may be similar or identical to the rotor shown in FIG. 2. Accordingly, the height reduction of the stator can result in height reduction of a lateral wall portion 211 formed in the base of the rotor frame 210 shown in FIG. 2. In other words, the height reduction of the stator and rotor can be enabled by whether the insulator is provided or not.

As shown in FIG. 6, a core rib 324 may be provided in a bottom surface of the upper insulator 320. The core rib 324 may face an inner circumferential surface 311a of the stator core shown in FIG. 3. The core rib 324 faces the core rib 334 of the lower insulator 330 shown in FIG. 7 to insulate the inner circumferential surface 311a of the stator core from the outside.

The lower insulator 330 may include a flat surface 321 configured to cover a top surface of the back yoke 311 provided in the stator core. A projection 327 may be projected from the flat surface 321.

The flat surface 321 may be provided in an outer portion of the radial direction with respect to the core rib 324 and it may cover an entire area of the top surface 311c of the back yoke 311, such that the back yoke 311 may be insulated from the draw lead of the coil and the ends of the coil by the flat surface 321.

After the flat surface 321 covers the top surface 311a of the back yoke 311, the upper insulator 320 may be rotated on the back yoke 311. In other words, a circumferential direction position of the upper insulator 320 might be changed, which can mean that a coupling position of the upper insulator 320 with the lower insulator 330 can be dislocated.

Accordingly, the upper insulator 320 has to be fixed at a regular position along a circumferential direction of the back yoke 311. For that, the projection 327 may be provided in the flat surface 321 and it may be inserted in a cogging portion or a penetrating hole provided in the back yoke 311. Here, it is preferred that a plurality of projections 327 may be provided along the circumferential direction.

The connection between the projections 327 and the penetrating hole 313 may allow the upper insulator 320 coupled to the stator core 310 at the regular position.

Meanwhile, the connection between the projections 327 and the penetrating hole 313 may allow the coil winding rib 322 of the upper insulator 320 to be positioned in the center of the teeth 312. A portion 321a of the coil winding rib 322 where the coil winding rib 322 is provided may be expanded in a radial direction. In other words, an expanded portion 321a expanded in a radial direction may be provided, corresponding to the coil winding coil 322. Such an expanded portion 321a may be formed to cover the tooth body 315 partially.

In this instance, the expanded portion 321a may perform a function of reinforcing the rigidity of the coil winding rib 322, such that an insulation distance between the coil and the outer circumferential surface 311b of the back yoke 311 can be secured. This is because the coil can be wound after the insulator 320 and 330 is coupled to the stator core 310 according to this embodiment.

Figure 7:
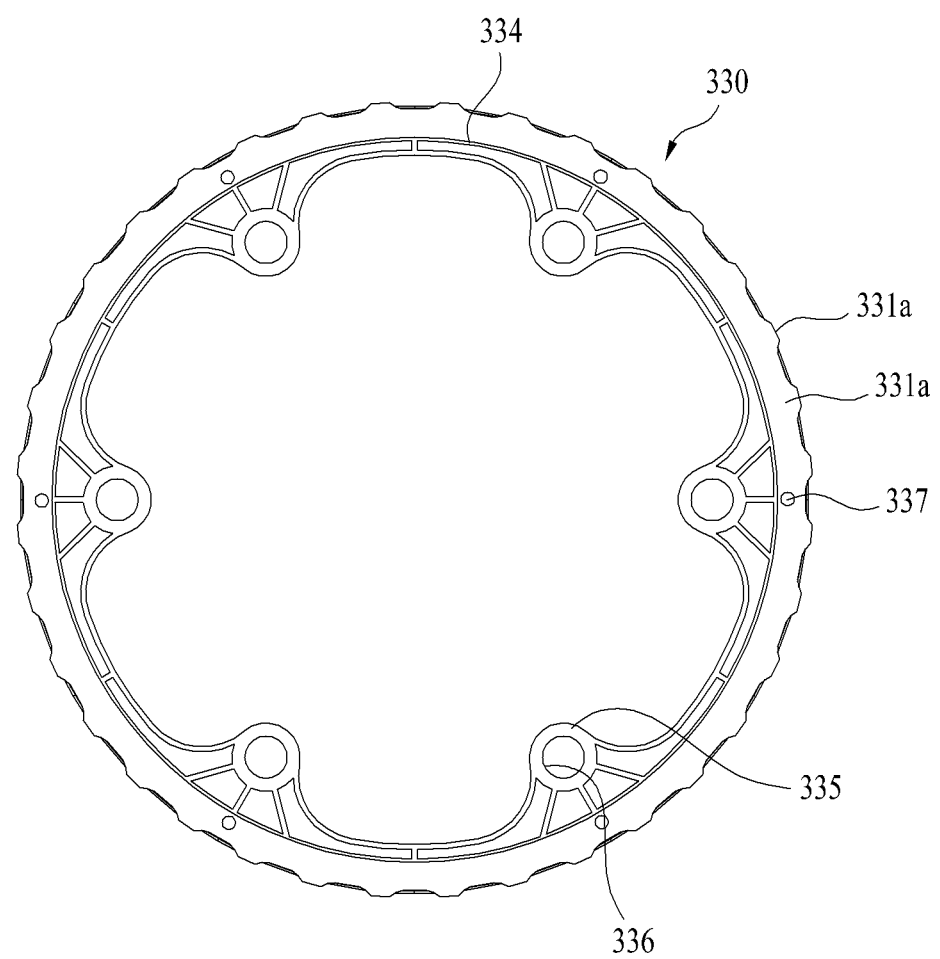
FIG. 7 is a plane diagram of a lower insulator according to one embodiment.
Figure 8:
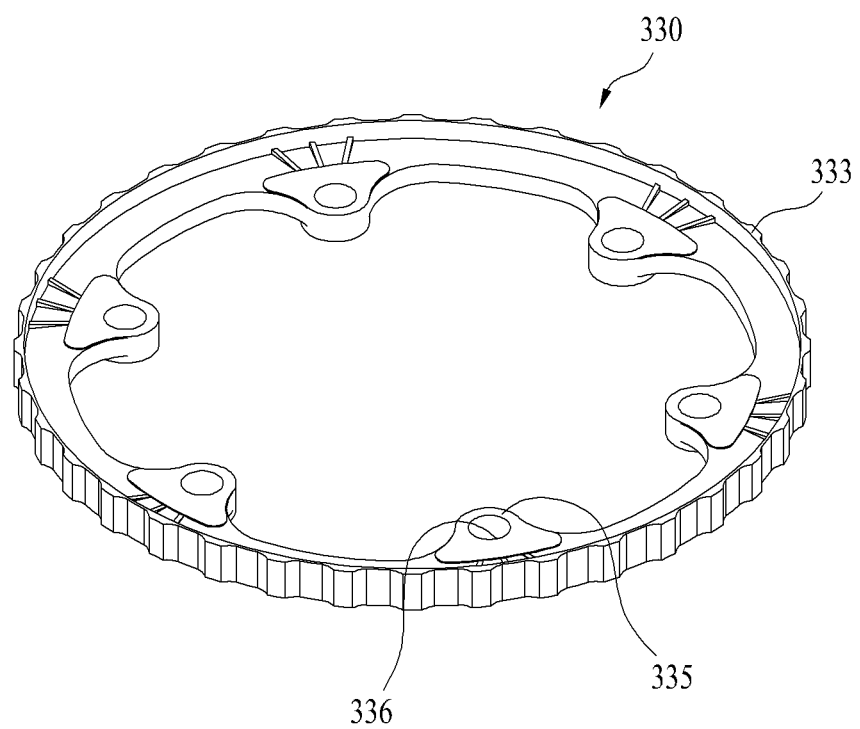
FIG. 8 is a perspective diagram illustrating a bottom surface of the lower insulator shown in FIG. 7.

Referring to FIGS. 7 and 8, the lower insulator 330 will be described in detail as follows.

FIG. 7 is a plane diagram of the lower insulator 330 and FIG. 8 is a perspective diagram illustrating a bottom surface of the lower insulator.

As shown in the drawings, a top surface of the lower insulator 330 may be similar to a bottom surface of the upper insulator 320 mentioned above. Even the lower insulator 330 is coupled to the back yoke 311 and to the upper insulator 320.

Even the lower insulator 330 may include a flat surface 331, an expanded portion 331a, a core rib 334, a coupling boss 335, a coupling hole 336 and a projection 337.

Furthermore, the lower insulator may include an insulator rib 333 provided in a bottom surface thereof, corresponding to the coil winding rib 322 of the upper insulator 320. The insulator rib 333 of the lower insulator may be configured to protect the coil from the ground when handing or keeping the motor, like the insulator rib 323 of the upper insulator. As the height of the coil is reduced, the height of the insulator rib 333 can be reduced.

Figure 9:
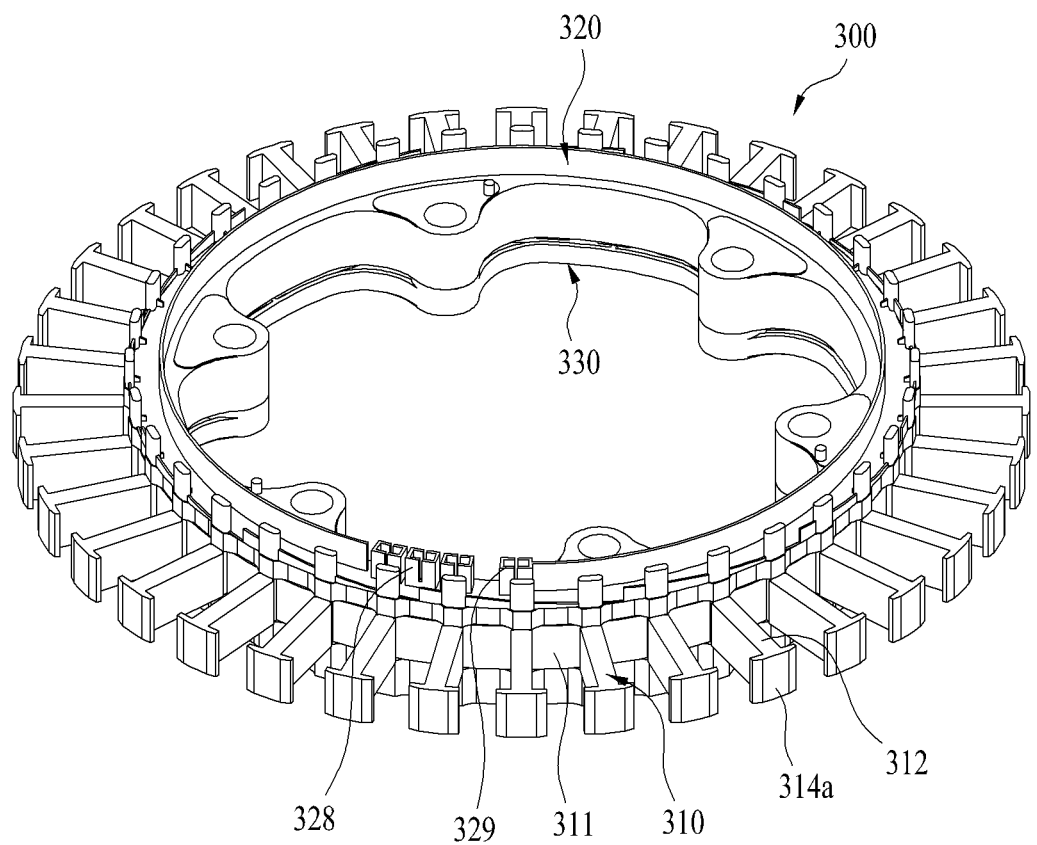
FIG. 9 is a perspective diagram of a stator according to one embodiment.

FIG. 9 illustrates the stator 300 having the stator core 310, the upper insulator 320 and the lower insulator 330 coupled to each other as mentioned, referring to FIGS. 3 to 8.

As shown in FIG. 9, the stator core 310 is insulated from the outside by the insulator 320 and 330 and the insulation film 314. The largest external diameter surface 314a of the tooth 312 can be excluded from the insulation.

Specifically, the insulator may be provided to insulate the back yoke from the draw lead of the coil, from an end of the coil and from the outside. In contrast, the insulation film may be provided to insulate the coil from the teeth and from the back yoke. Accordingly, the insulator and the insulation film may be provided independently and include a plurality of insulation means formed of different materials, respectively. Alternatively, they may include the plurality of the insulation means independently coupled to the stator core. Insulation means independently positioned in different positions may be provided in the stator core. In this instance, overlapped portions might be generated and such overlapped portions allow the insulation ability to have more improved reliability.

The coils may be wound around the teeth 312 of the stator 300 in an order of u, v and w, respectively. The draw lead of the coil is wound around the coil winding rib 322 and then it has a height different from the height of another coil having the different pole, before connected to the next tooth 312.

One end of each coil is fixed to the tap terminal 328 for power connection and the other end is fixed to the neutral point terminal 329, only to fabricate one stator 300.

In this instance, the coil may be directly wound around a tooth 312 having the insulation film provided thereon, such that damage on the insulator caused in the winding process can be prevented. This is because the coil is not wound around the insulator.

Meanwhile, in case the object where the stator 310 is applied is a washing machine, for example, the washing machine can be used in humid environments and the moisture might be penetrated between the insulator and the stator core.

As shown in FIG. 3, the insulation film 340 may be provided even to a predetermined portion 311*e* of the top surface 311*c* and 311*d* possessed by the back yoke 311. In other words, the insulation film 340 may be continuously extended from an outer circumferential surface 311*b* of the back yoke 311 even to a predetermined portion of the top surface possessed by the back yoke 311.

Specifically, the insulation film may be provided in an outer portion 311*c* in a radial direction with respect to the penetrating hole 313 formed in the back yoke 311 and not in an inner portion in the radial direction with respect to the penetrating hole 313. The bottom surface of the back yoke 311 may have the same configuration.

Accordingly, a sufficient insulation function can be secured even if the moisture is penetrated between the back yoke 311 and the insulator 320 and 330. This is because the insulation means are secured overlappedly. In addition, the insulator 320 and 330 can be coupled to press the top and bottom surfaces of the back yoke and then the insulation function having an improved reliability can be secured.

Meanwhile, it is preferred that the insulation film 340 is not provided in the inner portion 311*d* of the radial direction with respect to the back yoke, because of following reasons.

First of all, the insulation film 340 is not provided in the inner portion to prevent an unnecessary waste of the insulation material and to couple the stator core 310 to the insulator 320 and 330 precisely and to couple the insulators to each other precisely.

The stator 300 may be fixed to a vibrating object such as the tub of the washing machine and then it is necessary to minimize the noise generated by the vibration or shaking of the stator 300. Accordingly, the precise coupling between the stator core 310 and the insulators 320 and 330 can reduce the noise as much as possible.

Figure 10:
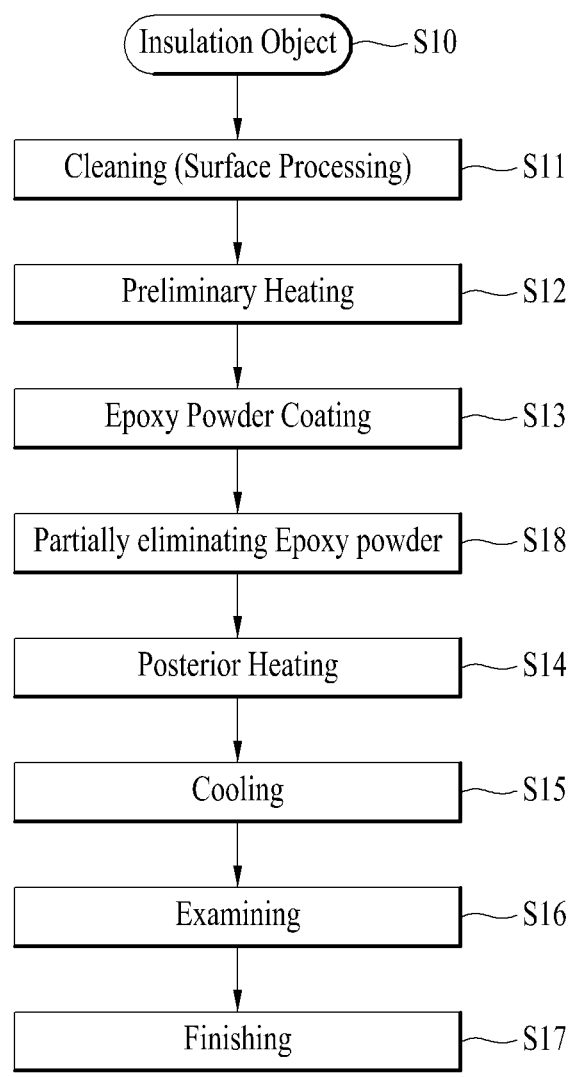
FIG. 10 is a flow chart illustrating a process of fabricating a stator core according to one embodiment.

FIG. 10 illustrates a process of forming the insulation film in the motor according to this embodiment.

First of all, an insulation object is fabricated (S10) and cleaning or surface-processing may be performed (S11). In this instance, the insulation object may be the stator core 310 formed of a conductive material. A surface of the stator core 310 is physically and chemically cleaned and an insulation film can be formed uniformly.

Meanwhile, the surface processing may include a step of making the portion where the insulation film is not formed. For example, a mask is covered on an inner circumferential surface of the stator core not to form the insulation film in the portion.

Hence, the insulation object is preliminarily heated (S12) and polymer resin powder is painted or coated on the insulation object (S13). Once the painting or coating is completed, a process of eliminating the mask may be performed.

After the painting or coating (S13) is completed, a heating process (S14) is performed and the insulation film is hardened. Hence, a cooling process (S15) and an examination process (S16) may be performed and then the insulation film may be formed completely (S17).

At this time, to form the uniform insulation film, various painting or coating methods may be performed. Specifically, liquid polymer resin is not used and it is preferred that powder polymer resin is used. The polymer resin powder may be coated on the insulation object by using an electrostatic spray or a fluidized bed type device.

According to a method of using such an electrostatic spray, an electrode of the insulation object is differentiated from an electrode of a powdered paint and the powdered paint is sprayed to the insulation object by using compressed-air. After that, the paint is heated and saturated, and then the saturated paint is hardened.

According to a method using a fluidized bed method, air is blowing via a porous plate to generate flow of powdered paint and the pre-heated insulation object is placed to attach the powdered paint to the insulation object.

An electrostatic fluidized bed method is the same as the fluidized bed method. However, instead of the preliminary heating, a static electricity is used in attaching the powdered paint to the insulation object.

Figure 11:
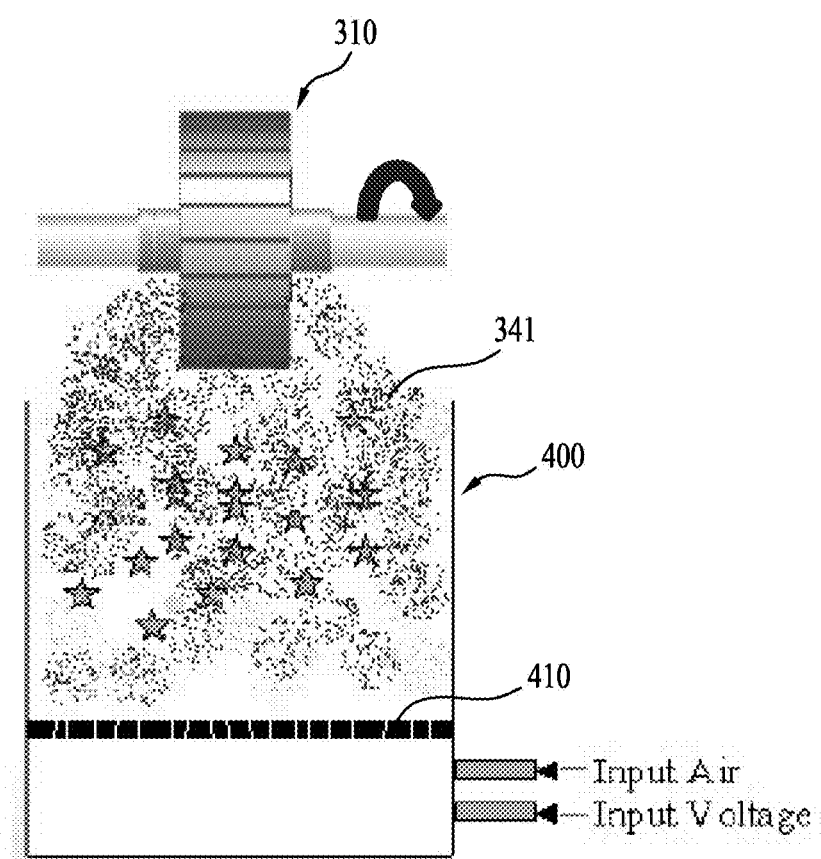
FIG. 11 is a conceptual diagram illustrating a process of attaching polymer resin powder paint.

FIG. 11 is a conceptual diagram illustrating a process of attaching polymer resin powder paint by using an electrostatic fluidized bed device 400.

The stator core is grounded to both opposite polarities and air is blowing via a porous plate 410. In the meanwhile, a powdered paint is electrified into a negative pole and the flowing powdered paint 341 may be attached uniformly as the stator core 310 is rotated.

Figure 12:
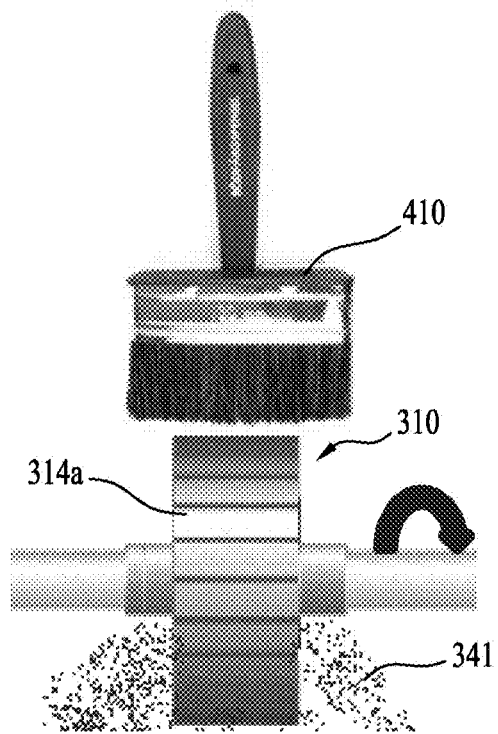
FIG. 12 is a conceptual diagram illustrating a process of partially eliminating the attached polymer resin powder paint.

As shown in FIG. 12, once the stator core 310 is rotated with a fixed brush 410, the powdered paint attached to the largest external diameter surface 314*a* of the stator core can be eliminated. After that, the process of attaching the powdered paint is completed and the insulation film is formed by heating the attached powdered paint.

The stator core 310 having the insulation film formed therein is coupled to the insulators 320 and 330. After that, the stator shown in FIG. 9 may be formed and the coils are wound around the stator. Accordingly, the overall stator can be fabricated.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor including a stator and a rotor that rotates with respect to the stator, the stator comprising:
 a stator core including a back yoke and a plurality of teeth on which a coil is wound, the plurality of teeth projecting from the back yoke in a radial direction;
 an insulator provided on a predetermined portion of the stator core in a radial direction with respect to the stator core to insulate the stator core from an outside;
 an insulation film integrally formed on the other portion of the stator core in the radial direction with respect to the stator core toward the plurality of teeth, to insulate the stator core including the plurality of teeth from the coil, wherein each tooth of the plurality of teeth includes:
  a tooth body extending in a radial direction from an outer or inner circumferential surface of the back yoke; and
  a pole shoe extending from one end of the tooth body in both circumferential directions, wherein an external or internal diameter surface of the pole shoe faces the rotor with a gap therebetween, wherein the insulation film is formed on an entire surface of the tooth except for the external or internal diameter surface of the pole shoe, wherein an end surface is provided on both ends of the external diameter surface or the internal diameter surface with reference to a direction in which the rotor is rotated, wherein the end surface faces the rotor directly via the gap therebetween, and wherein the insulation film is formed on the end surfaces of the pole shoe.

2. The motor according to claim 1, wherein the insulator includes an upper insulator and a lower insulator provided at a top and a bottom of the stator core to be coupled to the stator core.

3. The motor according, to claim 1, wherein the insulator includes a to terminal having one end of the coil fixed thereto.

4. The motor according to claim 3, wherein the tap terminal includes a power connection tap terminal to which first ends of coils corresponding to u, v and w power phases are fixed and a neutral point tap terminal to which second ends of the coils corresponding to u, v and w power phases are fixed.

5. The motor according to claim 4, wherein the insulator includes a coil winding rib configured to fix a draw lead formed when each of the coils corresponding to u, v and w power phases is moved from one tooth to another tooth.

6. The motor according to claim 1, wherein the insulator includes a coupling boss configured to couple the stator to an object.

7. The motor according to claim 1, wherein the insulation film is formed by attaching a polymer resin powder paint to the stator core.

8. A motor including a stator and a rotor that rotates with respect to the stator, the stator comprising:
 a stator core including a back yoke and a plurality of teeth projected to an inner portion or an outer portion in a radial direction of the stator core, and having a coil wound there around;
 an insulator formed by a plastic injection molding process to be coupled to the stator core;
 an insulator film formed from an inner or outer circumferential surface of the stator core to an end of the plurality of teeth continuously to insulate the plurality of teeth from the coil, the insulator formed by coating, heating and hardening a polymer resin powder;
 wherein the insulation film is formed on an entire surface of each tooth of the plurality of teeth except for a portion of an external or internal diameter surface of each tooth that forms a gap with the rotor, wherein the end of the plurality of teeth includes an end surface which is provided on both ends of the external diameter surface or the internal diameter surface with reference a direction in which the rotor is rotated, wherein the end surface faces the rotor via the gap therebetween, and wherein the insulation film is formed on the end surface.

9. The motor according to claim 8, wherein the insulation film on a predetermined portion of a top surface and a bottom surface of the stator core coupled to the insulator, and the insulator is coupled to the top surface and the bottom surface of the stator core.

10. The motor according to claim 9, wherein a plurality of penetrating holes is formed in the stator core along a circumferential direction and a projection is formed on the Insulator to be inserted into one of the plurality of penetrating holes to determine a coupling position of the insulator with respect to the stator core.

11. The motor according to claim 10, wherein the insulation film is formed only on predetermined portions of top and bottom surfaces of the stator core which are adjacent to the plurality of teeth with respect to the one of the plurality of penetrating holes.

12. The motor according to claim 9 wherein the insulator is configured to cover the top and bottom surfaces of the stator core.

* * * * *